(12) United States Patent
Ham et al.

(10) Patent No.: US 9,298,009 B2
(45) Date of Patent: Mar. 29, 2016

(54) WEARABLE DISPLAY DEVICE AND METHOD OF CONTROLLING THEREFOR

(71) Applicant: LG ELECTRONICS INC., Seoul (KR)

(72) Inventors: Junseok Ham, Seoul (KR); Yoonho Shin, Seoul (KR); Sangrae Kim, Seoul (KR); Sungjae Chung, Seoul (KR); Jungah Park, Seoul (KR); Yoonseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/520,043

(22) Filed: Oct. 21, 2014

(65) Prior Publication Data

US 2016/0062116 A1    Mar. 3, 2016

(30) Foreign Application Priority Data

Aug. 26, 2014  (KR) .......................... 10-2014-0111260

(51) Int. Cl.
  *G02B 27/01*   (2006.01)
  *G06F 3/01*    (2006.01)
(52) U.S. Cl.
  CPC .............. *G02B 27/017* (2013.01); *G06F 3/013* (2013.01); *G02B 2027/0178* (2013.01)

(58) Field of Classification Search
  CPC ............ G02B 27/017; G02B 27/00187; G06F 3/0418
  See application file for complete search history.

(56) References Cited

U.S. PATENT DOCUMENTS

| | | | |
|---|---|---|---|
| 5,995,291 A | 11/1999 | Togino | |
| 6,529,331 B2 | 3/2003 | Massof et al. | |
| 7,928,926 B2 | 4/2011 | Yamamoto et al. | |
| 2014/0062854 A1 | 3/2014 | Cho | |
| 2014/0333521 A1* | 11/2014 | Hwang | G09G 3/003 345/156 |

FOREIGN PATENT DOCUMENTS

KR   10-2014-0090549 A   7/2014

* cited by examiner

*Primary Examiner* — Gerald Johnson
*Assistant Examiner* — Maheen Javed
(74) *Attorney, Agent, or Firm* — Birch, Stewart, Kolasch & Birch, LLP

(57) ABSTRACT

A method of controlling a wearable display device according to one embodiment of the present specification can provide an optimized display in a manner of evaluating a front visual field of a wearer and a visual field of the wearer for a reference display area. And, in evaluating the front visual field of the wearer, it may provide the wearable display device capable of providing much more information as well as safer information in consideration of the reference display area.

19 Claims, 7 Drawing Sheets

(a)

(b)

(c)

(a)　　　　　　　　　　　(b)

(a)  (b)

FIG. 9
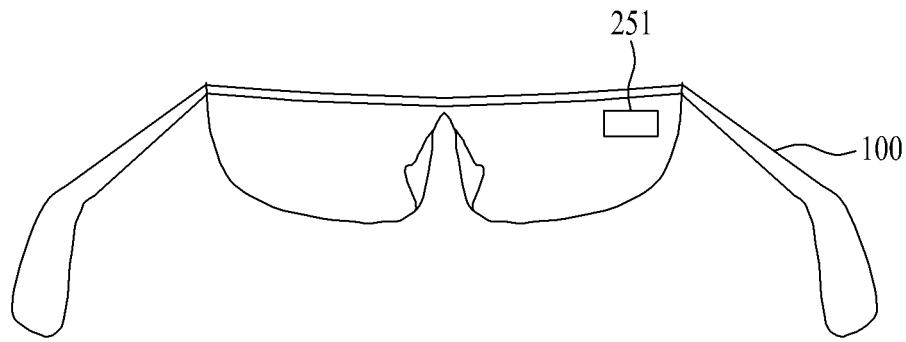
(a)
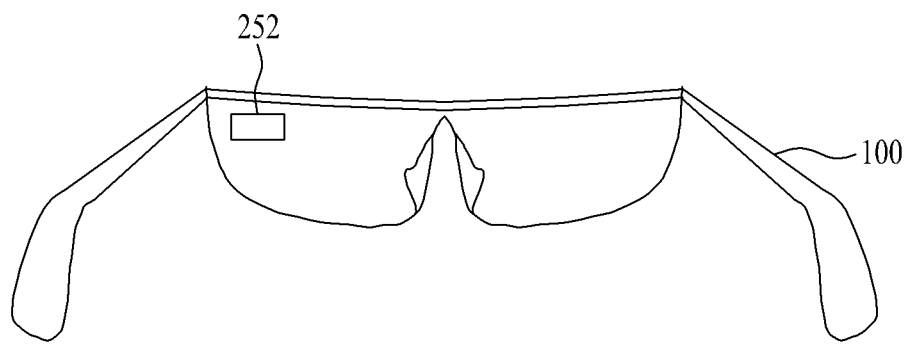
(b)
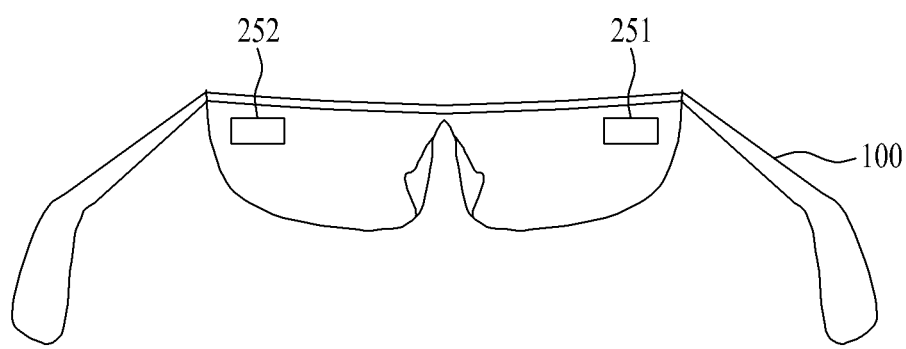
(c)

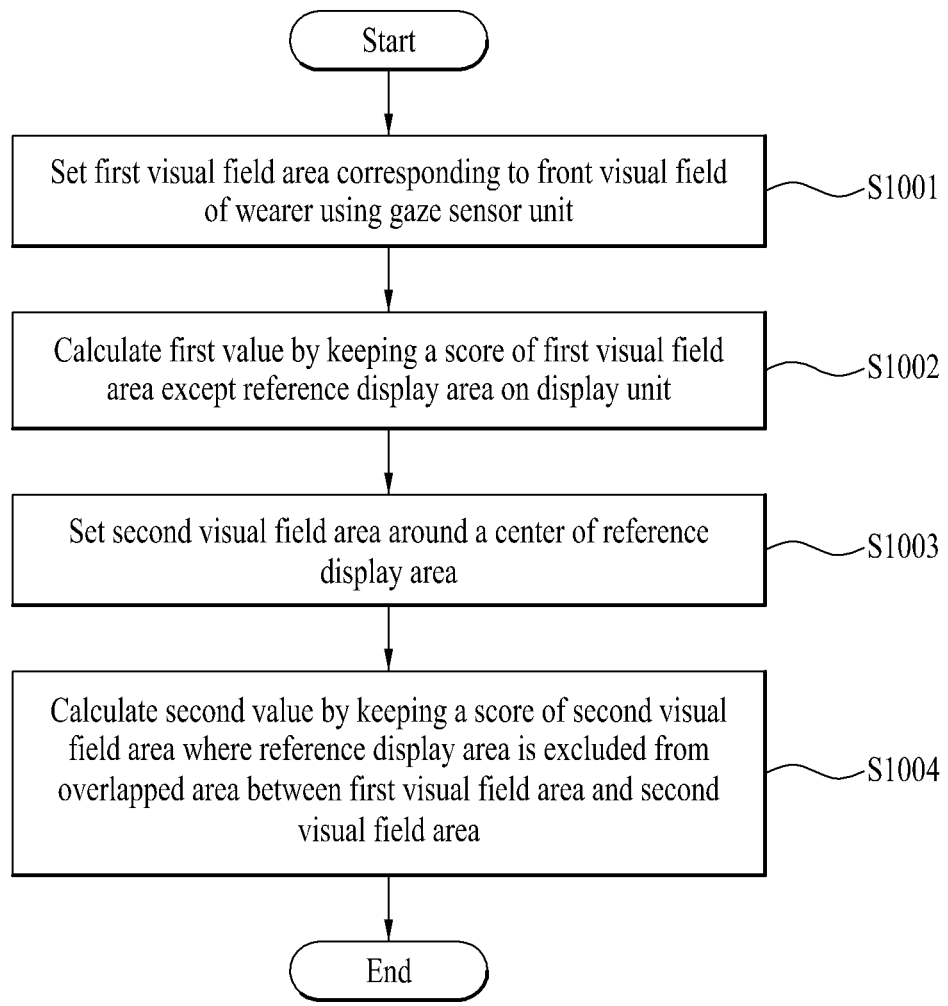

WEARABLE DISPLAY DEVICE AND METHOD OF CONTROLLING THEREFOR

This application claims the benefit of the Korean Patent Application No. 10-2014-0111260, filed on Aug. 26, 2014, which is hereby incorporated by reference as if fully set forth herein.

BACKGROUND OF THE INVENTION

1. Field of the Invention

The present specification relates to a wearable device and a method of controlling therefor.

2. Discussion of the Related Art

FIG. 1 is a diagram for an example of a wearable display device according to the present specification.

A wearable device mounted on a body of a user is used. For instance, FIG. 1 shows a HMD (head mounted display) corresponding to an example of the wearable display device 100. As shown in FIG. 1, since the wearable display device 100 has a shape similar to that of eyeglasses, the wearable device can be worn all the time and may include a display unit 120.

The display unit 120 of the wearable display device 100 is positioned in the vicinity of eyeballs of a user wearing the wearable display device. Hence, the wearable display device 100 can provide an image of a big size to the user using the display unit 120 of a relatively small size. In general, the wearable display device 100 displays an image on a part of the display unit 120.

The wearable display device 100 can be used in various environments (i.e., while a user is walking, driving a vehicle or moving). Similar to the use of a mobile phone while driving, the wearable display device may incur dangerous situations. Hence, it is necessary for the wearable display device 100 to display an image on a position where a user has no difficulty to recognize the image while not blocking the user's visual field.

And, a display area recognized by a user wearing the wearable display device may vary according to a shape of a face of the user or a wearing habit of the user. Hence, it is necessary to determine a display position and a display size in consideration of an actual gaze of the user wearing the wearable display device.

SUMMARY OF THE INVENTION

Accordingly, the present specification is directed to an apparatus and method thereof that substantially obviate one or more problems due to limitations and disadvantages of the related art.

An object of the present specification is to provide a wearable device and a method of controlling therefor. In particular, the present specification intends to provide an enhanced wearable display device in a manner of evaluating a user gaze for a position on which content is displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a wearable display device includes a display unit configured to display at least one image, a gaze sensor unit configured to track a gaze of a wearer of the wearable display device and a processor configured to control the display unit and the gaze sensor unit, the processor further configured to set a first visual field area corresponding to a front visual field of the wearer using the gaze sensor unit, the processor further configured to calculate a first value by keeping a score of the first visual field area from which a reference display area on the display unit is excluded, the processor further configured to set a second visual field area around a center of the reference display area, the processor further configured to calculate a second value by keeping a score of the second visual field area where the reference display area is excluded from an overlapped area between the first visual field area and the second visual field area, the processor further configured to determine a display area on the display unit based on the first value and the second value.

To further achieve these objects and other advantages and in accordance with the purpose of the invention, as embodied and broadly described herein, according to one embodiment, a method of controlling a wearable display device includes the steps of setting a first visual field area corresponding to a front visual field of a wearer of the wearable display device using a gaze sensor unit of the wearable display device, calculating a first value by keeping a score of the first visual field area from which a reference display area on a display unit of the wearable display device is excluded, setting a second visual field area around a center of the reference display area, calculating a second value by keeping a score of the second visual field area where the reference display area is excluded from an overlapped area between the first visual field area and the second visual field area and determining a display area on the display unit based on the first value and the second value.

A wearable display device according to one embodiment of the present specification can provide a more enhanced visual field to a user wearing the wearable display device.

According to the present specification, a wearable display device can improve safety of a user wearing the wearable display device by securing maximum surrounding visual field.

According to the present specification, a wearable display device can provide an interface configured to determine an optimized display area.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram for a display area according to one embodiment of the present specification;

FIG. 10 is a flowchart for a method of controlling a wearable display device according to one embodiment of the present specification.

DETAILED DESCRIPTION OF THE INVENTION

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 2:
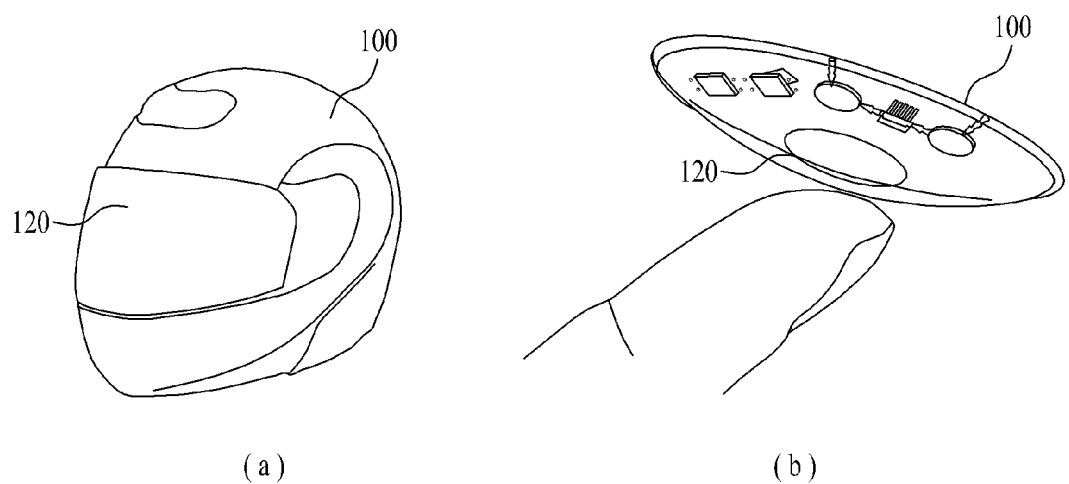
FIG. 2 is a diagram for other examples of a wearable display device.

FIG. 2 is a diagram for other examples of a wearable display device.

Figure 1:
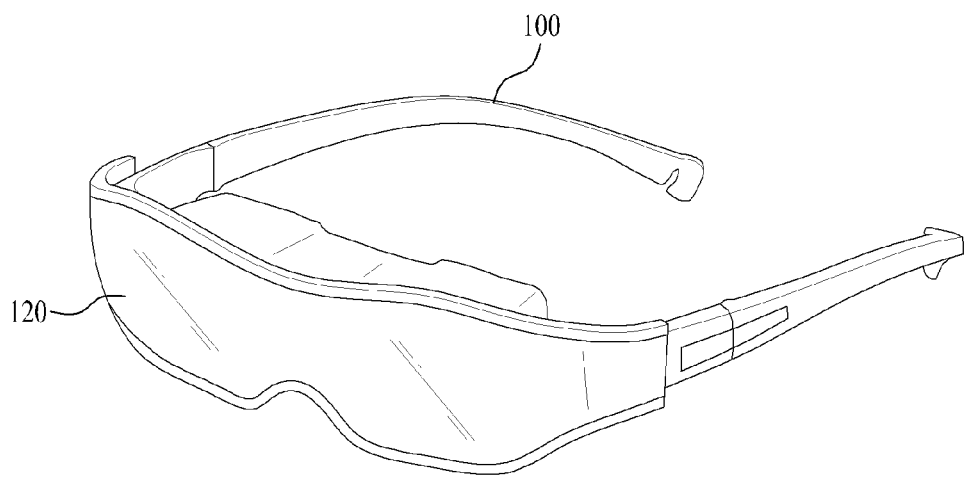
FIG. 1 is a diagram for an example of a wearable display device.

Referring to FIG. 1, the wearable display device 100 has a shape of a goggle or eyeglasses. Yet, the wearable display device 100 may have a different form.

For instance, as shown in FIG. 2 (a), the wearable display device 100 may have a form of a helmet. And, as shown in FIG. 2 (b), the wearable display device 100 may have a form of a contact lens. And, the wearable display device 100 may have various different wearable devices including a hat-like wearable device and the like. The wearable display device 100 can provide an open-view to a wearer. Hence, the wearable display device 100 can display one or more images while not blocking a visual field of the wearer. The wearable display device 100 can provide an augmented reality (AR) and/or a mixed reality (MR).

Figure 3:
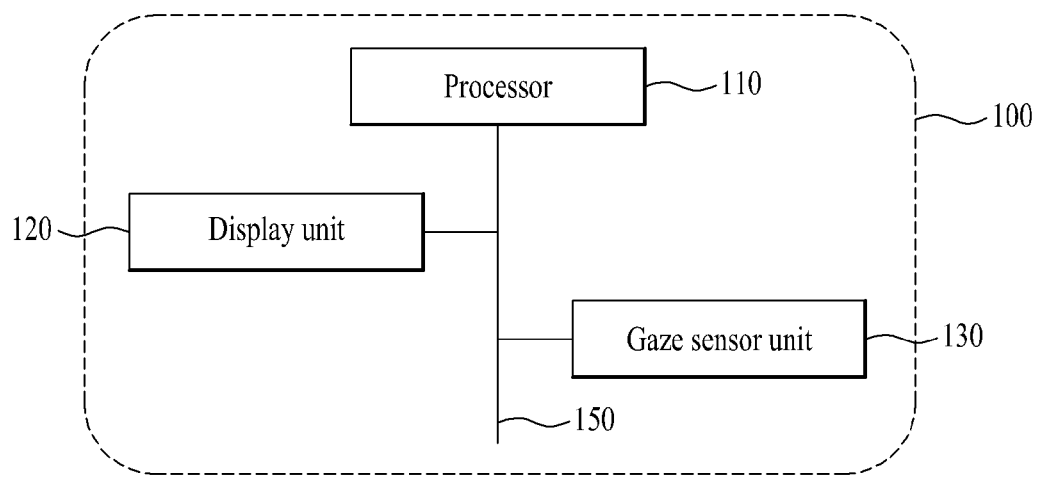
FIG. 3 is a block diagram for a wearable device according to one embodiment.

FIG. 3 is a block diagram for a wearable device according to one embodiment.

The wearable display device 100 according to the present specification can include a display unit 120 configured to display at least one image, a gaze sensor unit 130 configured to track a gaze of a wearer and a processor configured to control the display unit 120 and the gaze sensor unit 130.

The display unit 120 may include a transparent display unit, a lens, a plane of projection, a projector and/or a prism. The display unit 120 may display an external image of the wearable display device 100 in real time. The wearable display device 100 can display one or more images on a part of the display unit 120.

The gaze sensor unit 130 can track a gaze of a wearer. For instance, the gaze sensor unit 130 can include an image sensor facing an eyeball of the wearer. The image sensor can sense an image using visible ray or infrared. The gaze sensor unit 130 may track a gaze of the wearer by tracking an eyeball of the wearer. Meanwhile, as shown in FIG. 2 (b), a wearable display device 100 of a lens type may not include the gaze sensor unit 130. This is because the wearable display device of the lens type is able to secure a front visual field of the wearer. And, not only the wearable display device of the lens type but also a different wearable display device 100 may also not include the gaze sensor unit 130. In this case, the wearable display device 100 may obtain the front visual field of the wearer based on a predetermined virtual visual field without using the gaze sensor unit 130.

The processor 110 can control the display unit 120 and the gaze sensor unit 130. And, the processor 110 may control other components included in the wearable display device 100. The processor 110 can execute various applications in a manner of processing data of the wearable display device 100. The processor 110 can control the wearable device 100 and content executed in the wearable display device 100 based on a command.

And, the wearable display device 100 may further include other components not shown in FIG. 3. For instance, the wearable display device 100 may further include a communication unit configured to communicate with an external device. The communication unit performs communication via a wired or wireless network and can transmit/receive data. For instance, the communication unit can be installed in the wearable display device to access a network. For instance, the communication unit 130 may use WLAN (wireless LAN), IEEE 802.11 based wireless LAN, Wibro (wireless broadband), Wimax (world interoperability for microwave access), HSDPA (high speed downlink packet access), Bluetooth, NFC (near field communication) standard and the like to access a wireless network. And, the communication unit may access the internet via a wired/wireless network. And, the wearable display device 100 can receive context information from an external device using the communication unit. And, the wearable display device 100 may control an external device using the communication unit.

And, the wearable display device 100 may further include other components not shown in FIG. 3. For instance, the wearable display device 100 may further include a memory, an image sensing unit, a power supply, a housing, one or more sensors (e.g., a touch sensor, an acceleration sensor, a gyro sensor, a terrestrial magnetism sensor, a GPS sensor, a pressure sensor, an altitude sensor or a proximity sensor), an audio reception unit, an audio output unit or other components. And, the components of the wearable display device 100 may be connected with each other via a bus 150.

Meanwhile, the diagram of the wearable display device 100 shown in FIG. 3 corresponds to a block diagram according to one embodiment of the present specification. Blocks represented in a manner of being separated from each other show hardware configuration units of the wearable display device in a manner of being logically distinguished from each other. Hence, the configuration units of the wearable display device 100 can be implemented in a single chip or a plurality of chips depending on a design of the device.

Meanwhile, the wearable display device 100 according to the present specification can be controlled based on various inputs. For instance, the wearable display device 100 can include a physical button and may receive an input from the physical button. And, the wearable display device 100 can include an audio reception unit, perform a voice recognition based on a received audio and can be controlled based on the voice recognition. Specifically, the wearable display device 100 may perform a voice recognition of a syllable, a word or a sentence unit. The wearable display device may perform the voice recognition function by combining a recognized syllable, a word or a sentence with each other.

And, the wearable display device 100 may include a context sensing unit including at least one sensor selected from a sensor sensing an external image, a sensor sensing a position, a temperature sensor, an acceleration sensor and a gyro sensor. The context sensing unit may provide context information of a wearer to the wearable display device 100. The context information may include at least one selected from a moving speed, a movement, an acceleration and circumstantial information of the wearable display device 100.

And, the wearable display device 100 can perform an image analysis using an image sensing unit (not depicted) and can be controlled based on an analyzed image. And, the wearable display device 100 includes a touch sensing unit and can be controlled based on a touch inputted on the touch sensing unit. Moreover, the wearable display device 100 can be controlled based on a combination of the aforementioned inputs.

In the following, operations performed by the wearable display device 100 are explained with reference to FIGS. 4 to 10. The aforementioned configurations of the wearable display device 100 can be used for the operations of the wearable display device 100 described in the following. And, the operations of the wearable display device 100 and operations of the processor 110 may be explained in the following in a manner of being regarded as identical to each other.

Figure 4:
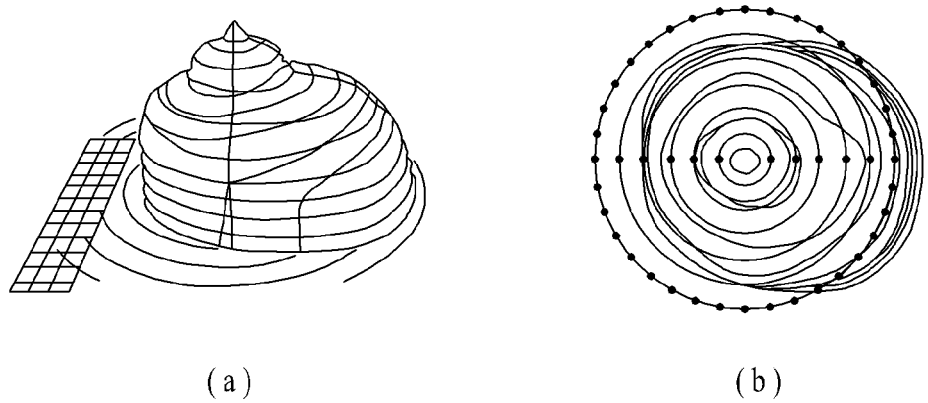
FIG. 4 is a diagram for visual fields formed on the basis of a single viewpoint.

FIG. 4 is a diagram for visual fields formed on the basis of a single viewpoint.

In the present specification, a visual field may indicate a range capable of being seen without moving eyes when a user is gazing at a prescribed point. And, when a person sees an object, the person can clearly see objects within a gaze direction and may recognize existence of objects situating in the vicinity of the gaze direction although they are not clearly seen. In this case, the former is called a center visual field while the latter is called a peripheral visual field. In particular, an amount of information capable of being recognized by a person may vary depending on each point of a visual field. A visual field can be measured or analyzed in various ways.

For instance, a visual field can be measured by analyzing information capacity for each point of the visual field. FIG. 4 (*a*) shows a graph of a visual field of a right eye, which is formed on the basis of a single viewpoint. In FIG. 4 (*a*), a floor surface indicates a spatial location in which a visual field is formed. Referring to FIG. 4 (*a*), a center of a concentric circle of the floor surface means a central point of the visual field. Since FIG. 4 (*a*) is depicted on the basis of the right eye, the visual field is formed in a manner of being leaned to the right side. In FIG. 4 (*a*), a height from the floor surface means capacity of information on the spatial location. Referring to FIG. 4 (*a*), there is the highest point in the right direction of the visual field. FIG. 4 (*b*) is a diagram looking down the graph of FIG. 4 (*a*) from the top. FIG. 4 (*b*) shows a shape of the visual field, which is formed in a manner of being leaned to the right side. As shown in FIG. 4 (*a*), a height of a central part of the visual field and that of a peripheral part of the visual field are different from each other. In particular, information amount capable of being recognized by a person at the center visual field is different from the information amount capable of being recognized by a person at the peripheral visual field.

Referring back to FIG. 1 and FIG. 2 again, the wearable display device 100 can display one or more images on at least a part of the display unit 120. The wearable display device 100 providing an open-view displays an image on a part of a visual field of a wearer in general. In this case, it is necessary to display the image on a location, which is recognizable by the wearer while not excessively blocking the visual field of the wearer. Hence, it is necessary to determine a display location capable of recognizing an image using a peripheral visual field when the wearer is facing the front of the wearer and the display location capable of recognizing environment of the front of the wearer using the peripheral visual field when the wearer sees the displayed image.

Figure 5:
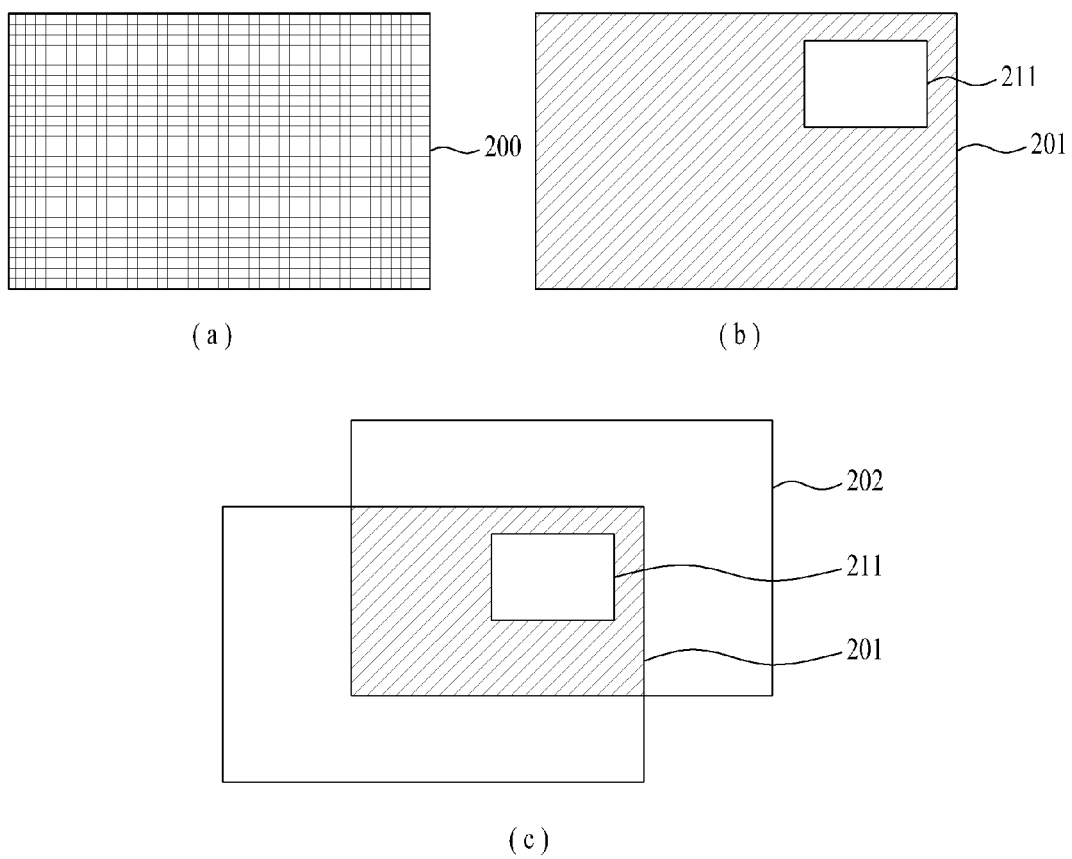
FIG. 5 is a diagram for a visual field evaluation process according to one embodiment of the present specification.

FIG. 5 is a diagram for a visual field evaluation process according to one embodiment of the present specification.

In order to draw an optimized display location, it is necessary to evaluate a visual field according to a display location. As mentioned in the foregoing description, when a wearer is facing (and gazing) the front side, a displayed image should not excessively block a visual field of the wearer. An area on which an image is displayed may be evaluated as the area blocking the visual field of the wearer. Hence, when a front visual field of the wearer is evaluated in a manner of excluding the area on which the image is displayed from the front visual field of the wearer, the extent of blocking of the front visual field can be evaluated.

And, when the wearer is gazing the displayed image, it is necessary for the wearer to recognize environment of the front of the wearer using a peripheral visual field. For instance, as an overlapped area between a visual field centered around the displayed image and a front visual field of the wearer is getting bigger, the wearer can more recognize the environment of the front while looking at the image. Yet, the visual field of the wearer is blocked by the area on which the image is displayed. Hence, when the visual field centered around the image is evaluated in a manner of excluding the area on which the image is displayed from the overlapped area between the visual field centered around the displayed image and the front visual field of the wearer, it is able to evaluate the extent of recognizing the environment of the front recognized by the peripheral visual field of the wearer.

Hence, an image can be displayed on a location where the extent of blocking the front visual field of the wearer is low and the extent of recognizing the environment of the front using the surrounding visual field is high at the same time.

FIG. 5 (*a*) shows a visual field area 200 consisting of N (N is a natural number equal to or greater than 1) number of cells. A weighted value can be allocated to each cell of the visual field area 200. For instance, the information capacity mentioned earlier with reference to FIG. 4 can be used as the weighted value. Hence, a high weighted value can be allocated to an area (e.g., a center visual field) near a central point of a visual field. And, a low weighted value can be allocated to an area (e.g., a peripheral visual field) far from the central point of the visual field.

Referring to FIG. 5 (*b*), a front visual field of a wearer is evaluated. The wearable display device 100 configures a first visual field area 201 corresponding to the front visual field of the wearer. As mentioned earlier with reference to FIG. 3, the front visual field can be obtained by the gaze sensor unit 130 as well. In order to obtain the front visual field of the wearer, the wearable display device 100 may provide a visual guide and/or an auditory guide. For instance, such a phrase as "gaze a front side" can be displayed on the display unit or such an audio as "gaze a front side" can be outputted. Yet, as mentioned earlier with reference to FIG. 3, the front visual field may correspond to a predetermined visual field.

The wearable display device 100 can keep a score of the first visual field area 201 from which a reference display area 211 is excluded. In other word, the wearable device 100 can calculate a score (hereinafter called a first value) for the front visual field of the wearer by keeping a score of an area where diagonal lines are drawn in FIG. 5 (b). The reference display area 211 may have a predetermined display location and a size. The predetermined display location and the size correspond to an initial position of an area on which an image is to be displayed.

The first value can be calculated based on the information capacity mentioned earlier with reference to FIG. 4. For instance, the first visual field area 201 can be divided into a plurality of cells as shown in FIG. 5 (a). And, a weighted value can be allocated to each of a plurality of the cells. When a person is gazing at a point, the weighted value can be configured based on a spatial range in which a visual recognition of the person is formed and a resolution. For instance, in the graph shown in FIG. 4 (a), a height value of each point can be allocated as a weighted value of the each point of the first visual field area 201. The first value can also be calculated by summing up weighted values allocated to the area in which diagonal lines are drawn depicted in FIG. 5 (b).

And, the wearable display device 100 can configure a second visual field area 202 located around a center of the reference display area 211. In case that the wearer is facing the reference display area 211, the wearable device 100 can calculate a score (hereinafter called a second value) for the front visual field by keeping a score of the second visual field area 202 where the reference display area 211 is excluded from an overlapped area between the first visual field area 201 and the second visual field area 202. In other word, the wearable device 100 can calculate the second value by keeping a score of the area in which diagonal lines are drawn depicted in FIG. 5 (c).

The second value can be calculated based on the information capacity mentioned earlier with reference to FIG. 4. For instance, the second visual field area 201 can be divided into a plurality of cells as shown in FIG. 5 (a). And, a weighted value can be allocated to each of a plurality of the cells. When a person is gazing at a point, the weighted value can be configured based on a spatial range in which a visual recognition of the person is formed and a resolution. For instance, in the graph shown in FIG. 4 (a), a height value of each point can be allocated as a weighted value of the each point of the second visual field area 202. Yet, unlike the weighted value of FIG. 5 (b), the weighted value is allocated on the basis of the reference display area 211 in FIG. 5 (c). The second value can also be calculated by summing up weighted values allocated to the area in which diagonal lines are drawn depicted in FIG. 5 (c).

The wearable display device 100 may determine a display area on which at least one image is to be displayed based on the first value and the second value. For instance, a location making a sum of the first value and the second value to be maximized may be determined as the display area. And, a location where the sum of the first value and the second value exceeds a predetermined threshold may be determined as the display area.

The sum of the first value and the second value can be repeatedly calculated. For instance, the wearable display device 100 may determine the display area making the sum of the first value and the second value to be maximized in a manner of moving the reference display area 211. Specifically, the wearable display device 100 moves the reference display area 211 and may be then able to calculate the first value and the second value for the moved reference display area 211.

The wearable display device 100 may find out the display area making the first value and the second value to be maximized in a manner of calculating the first value and the second value while continuously moving the reference display area 211. In order to prevent the calculation from being excessively repeated, the wearable display device 100 may move the reference display area 211 within a predetermined range (e.g., maximum eye rotation) only.

Meanwhile, the reference display area 211 can be moved based on a movement of a gaze of the wearer. For instance, the wearable display device 100 may display the reference display area 211 on the display unit. And, the wearable display device 100 may provide a visual guide and/or an auditory guide configured to move the gaze of the wearer. For instance, it may provide a guide making the wearer see the reference display area 211. And, the wearable display device 100 may provide a guide making the wearer move the gaze of the wearer. If the wearer moves the gaze of the wearer to a direction preferred by the wearer in response to the guide, the first value and the second value are calculated based on the moved reference area 211 and an optimized display area can be calculated in the vicinity of the moved gaze. When the gaze of the wearer is used, a maximum eyeball rotation can be considered for determining the optimized display area.

Meanwhile, the reference display area 211 can be displayed on an external device. For instance, the wearable display device 100 may further include a communication unit configured to communicate with an external device and may make the external device display an image corresponding to the reference display area 211 using the communication unit. The wearable display device 100 may calculate the first value and the second value while moving the image corresponding to the reference display area 211 on the external device. Or, the wearable device may calculate the first value and the second value based on the reference display area 211, which has moved by a rotation of a head of the wearer. As the wearer is getting close or far to/from the external device, a size of the reference display area 211 may be adjusted. The wearable display device 100 may analyze a distance from the external device, a location of the external device and the like using the image sensing unit.

Meanwhile, in finally determining a display area, the wearable display device 100 may consider a maximum eye rotation. For instance, the wearable display device 100 may determine a display area situating within a maximum eye rotation radius only among a plurality of display areas where the sum of the first value and the second value exceeds a predetermined threshold as a final display area.

When the final display area is determined, the wearable display device 100 can provide at least one selected from the group consisting of visual feedback, auditory feedback and tactile feedback. For instance, when the display area is determined, the wearable display device 100 may output a beep sound or vibration. And, the wearable display device 100 can display at least one image on the determined display area.

Meanwhile, the wearable display device 100 can adjust a size of the reference display area 211 and/or a size of the final display area based on a distance between a pupil of the wearer and the display unit. The wearable display device 100 can be worn in a different way according to a habit of the wearer. And, the wearable display device 100 can be worn in a different way according to a shape of a face of the wearer. Hence, a distance between the display unit of the wearable display device 100 and the pupil of the wearer may vary according to a wearer. As the distance varies, an error may occur between an intended display size and a display size recognized by the wearer. Hence, the wearable display device 100 can adjust a size of the reference display area 211 and/or a size of the final display area based on the distance between the pupil of the wearer and the display unit. And, the wearable device 100 may measure the distance between the display unit and the pupil of the wearer using the gaze sensor unit.

In the following, one embodiment of the present specification is explained with reference to FIGS. 6 to 8. In the present embodiment, a display size of an image is configured to correspond to a display of 25 inches situating at the front as far as 243 cm. In the present embodiment, the sum of the first value and the second value possessed by each of cells is calculated by the method mentioned earlier with reference to FIG. 5 and the cells are selected in consideration of a maximum eye rotation.

Figure 6:
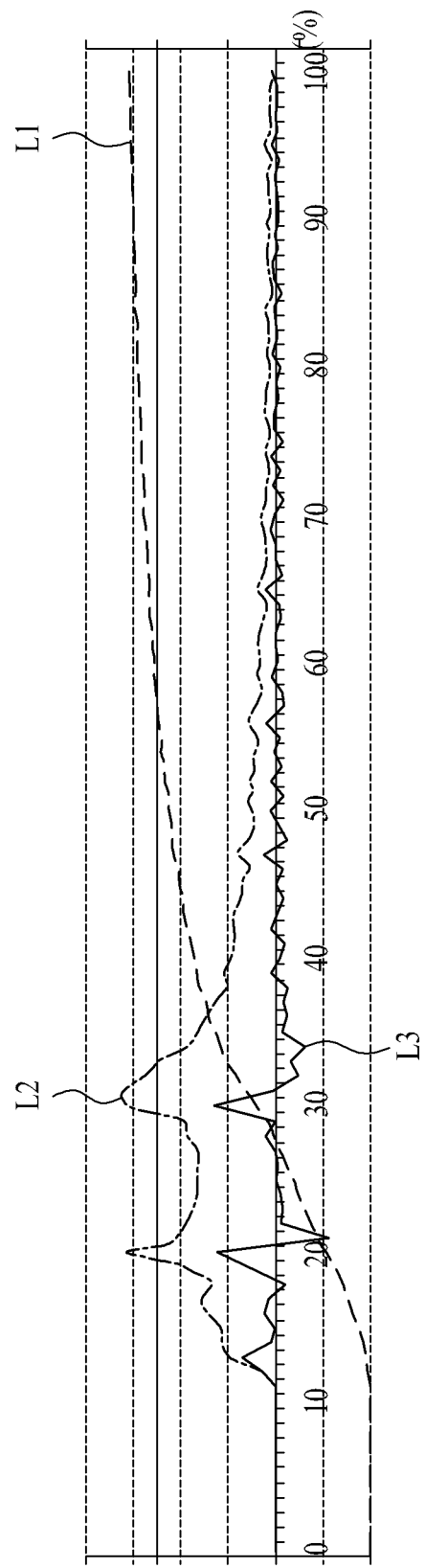
FIG. 6 is diagram for a graph of which a result according to one embodiment of the present specification is analyzed.

FIG. 6 is diagram for a graph of which a result according to one embodiment of the present specification is analyzed.

In FIG. 6, a horizontal axis of a graph indicates the sum of the first value and the second value from the top 0% to the top 100% listed in the right direction. In this case, An L1 means the number of cells existing in a maximum eye rotation. Referring to the L1, it is able to know a trend that the number of cells existing in the maximum eye rotation is gradually increasing from the top 10% of the sum of the first value and the second value. An L2 is a graph indicating a change amount of the L1, i.e., a differential value of the L1. And, an L3 is a graph indicating a differential value of the L2.

According to the present embodiment, an optimized position and an optimized area are deducted from an inflection point of a slope of the L1 in consideration of a shape of the L1 graph.

Figure 7:
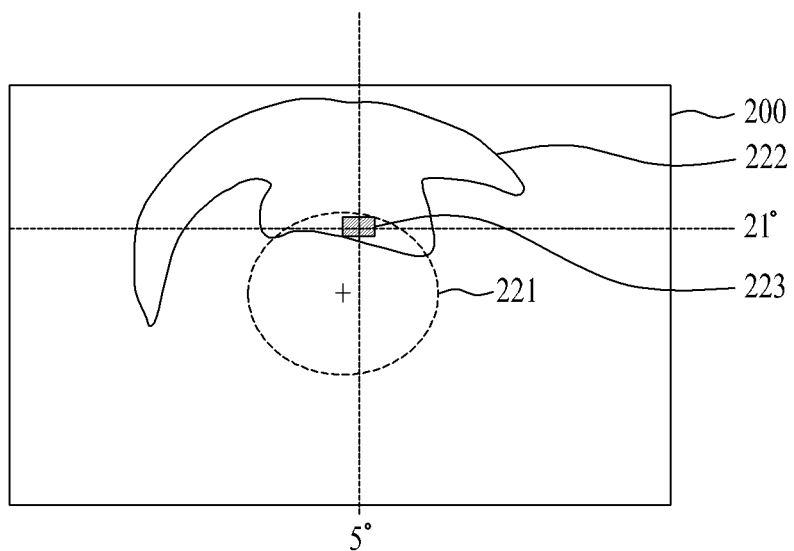
FIG. 7 is a diagram for an optimized position according to one embodiment of the present specification.

FIG. 7 is a diagram for an optimized position according to one embodiment of the present specification.

In FIG. 7, a high rank display position 222 indicates cells positioned in the vicinity of a first inflection point (about top 20%) of the L3 in FIG. 6. And, in case of considering a maximum eye rotation 221 and a display size, the optimized display position 223 may exist on a position of 21 degrees up and 5 degrees right from a central part.

Figure 8:
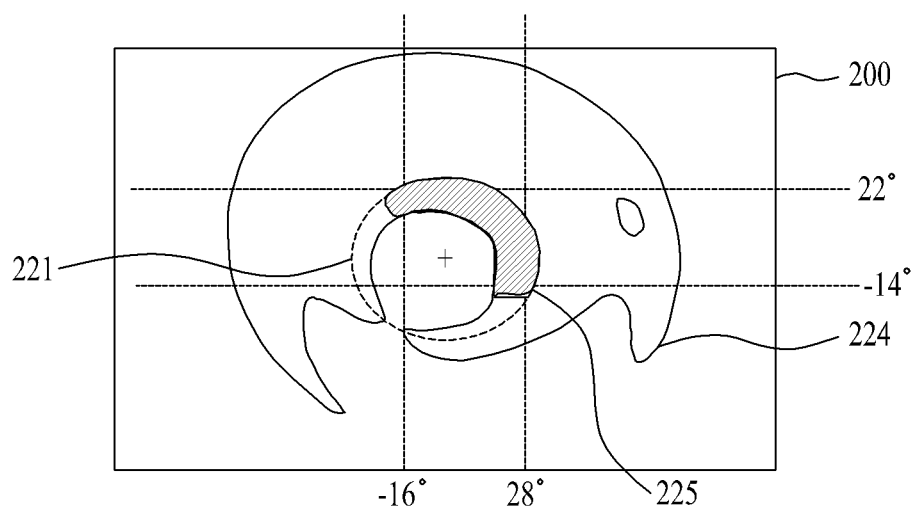
FIG. 8 is a diagram for an optimized area according to one embodiment of the present specification.

FIG. 8 is a diagram for an optimized area according to one embodiment of the present specification.

In FIG. 8, a high rank display area 224 indicates cells positioned in the vicinity of a second inflection point (about top 30%) of the L3 in FIG. 6. And, in case of considering a maximum eye rotation 221, the optimized display area 224 may exist between −14 degrees and 22 degrees in a vertical direction and between −16 degrees and 28 degrees in a horizontal direction.

The optimized display area and the optimized display position deducted from FIGS. 6 to 8 are just an example. A result value may vary according to an experiment condition.

FIG. 9 is a diagram for a display area according to one embodiment of the present specification.

Like a left-handed and a right-handed, a person has a dominant eye and a non-dominant eye among both eyes. The dominant eye indicates a more preferred eye when a person receives a visual input. The non-dominant eye indicates an eye, which is not the dominant eye. In general, a person uses both eyes to recognize visual stimulus. Yet, in case of recognizing the visual stimulus using one eye, a direction of a preferred eye, i.e., a direction of the dominant eye varies depending on a person. Hence, in case of using the wearable display device 100, it is necessary to consider a dominant eye and a non-dominant eye of a wearer when an image is displayed.

As shown in FIG. 9, the wearable display device 100 may display an image on a right eye display area 251 (FIG. 9 (a)), may display an image on a left eye display area 252 (FIG. 9 (b)) or may display an image on both the right eye display area 251 and the left eye display area 252 (FIG. 9 (c)).

A wearer of the wearable display device 100 can configure a dominant eye. For instance, the wearable display device 100 can provide a visual and/or an auditory guide to the wearer to determine the dominant eye of the wearer. And, the wearer determines the dominant eye based on the guide and can set the dominant eye to the wearable device 100. If the dominant eye of the wearer is predetermined, the wearable device 100 may display an image on a side of the predetermined dominant eye of the wearer.

Meanwhile, the wearable display device 100 can determine a direction in which an image is displayed based on a type of the image. For instance, the image may include a main image and a sub image. In this case, the wearable display device 100 displays the main image on a side of the dominant eye and may display the sub image on a side of the non-dominant eye.

And, the wearable display device 100 may determine a direction in which an image is displayed based on a wearer or context information of the wearable display device 100. The wearable device 100 can display an image on at least one of a predetermined dominant eye side and/or a predetermined non-dominant eye side based on the context information. For instance, the context information may include at least one selected from the group consisting of a moving speed, a movement, acceleration and circumstantial information of the wearable display device 100. The circumstantial information may include an obstacle existing near the wearable display device 100, an object moving toward the wearable display device 100, ambient temperature and the like. The aforementioned context information is just an example. Various elements related to safety of the wearer may be called the context information.

For instance, if the wearer is moving faster than a predetermined speed, the wearable display device 100 may display an image on a non-dominant eye side for the safety of the wearer. And, if the wearer is in a stationary state, the wearable display device 100 may display an image on a dominant eye side. And, if the wearer is in conversation with a different person, the wearable display device 100 may display an image on the non-dominant eye side. In order to obtain the context information of the wearer or the wearable display device 100, the wearable display device 100 may further include a context sensing unit. For instance, the context sensing unit may include at least one selected from the group consisting of a sensor configured to sense an external image of the wearable display device 100, a sensor configured to sense a position of the wearable display device 100, a temperature sensor, an acceleration sensor and a gyro sensor. And, the wearable display device 100 includes a communication unit configured to communicate with an external device and may receive context information from the external device. The external device may include a sensor configured to sense the context information.

Meanwhile, the wearable display device 100 displays an image based on an application executed on the wearable display device 100 and can display the image on at least one of a predetermined dominant eye side and a predetermined non-dominant eye side based on a predetermined criteria. In other word, the wearable display device 100 categorizes an application according to the predetermined criteria and can determine a direction in which an image is displayed based on the application.

For instance, the wearable display device 100 can categorize an application into an immersive application and a non-immersive application based on an operation of the application. For instance, such an application requiring immersion of the wearer as a newspaper, an SNS, a game or a video playback program can be categorized as the immersive application. For instance, such an application as navigation, a schedule notification, local information, a message reception notification or a telephone call reception notification can be categorized as the non-immersive application.

The wearable display device 100 may display the immersive application on a predetermined dominant eye side and display the non-immersive application on a predetermined non-dominant eye side.

The methods of determining a display direction of an image mentioned earlier with reference to FIG. 9 can be combined with each other. For instance, the wearable display device 100 can determine a display direction based on context information and a type of an application. For instance, if an immersive application is executed and it is determined that there is no safety danger based on the context information, the wearable display device 100 may display an image on a right eye display area 251 and a left eye display area 252. If an immersive application is executed and it is determined that there is safety danger based on the context information, the wearable display device 100 may display an image on a predetermined dominant eye side of a wearer. In this case, the wearable display device 100 may provide a warning message corresponding to the safety danger to the wearer. Meanwhile, if a non-immersive application is executed, the wearable display device 100 may display an image on the predetermined dominant eye side of the wearer irrespective of the context information.

FIG. 10 is a flowchart for a method of controlling a wearable display device according to one embodiment of the present specification.

The wearable display device can configure a first visual field area corresponding to a front visual field of a wearer using a gaze sensor unit [S1001]. The wearable display device can include a structure mentioned earlier with reference to FIGS. 1 to 5 and FIG. 9. As mentioned earlier with reference to FIG. 5, the wearable display device may provide a visual and/or an auditory guide to obtain the front visual field of the wearer.

The wearable display device can calculate a first value by keeping a score of the first visual field area except a reference display area on a display unit [S1002]. As mentioned earlier with reference to FIG. 5, the wearable display device can calculate the first value in a manner of allocating a predetermined weighted value to the first visual field area.

The wearable display device sets a second visual field area around a center of the reference display area [S1003] and can calculate a second value by keeping a score of the second visual field area corresponding to an area where the reference display area is excluded from an overlapped area between the first visual field area and the second visual field area [S1004]. As mentioned earlier with reference to FIG. 5, the wearable display device can calculate the second value in a manner of allocating a predetermined weighted value to the second visual field area. And, the reference display area can be moved based on a gaze of a user.

The wearable display device can determine a display area on the display unit based on the first value and the second value [S1005]. The wearable display device can determine a point where the sum of the first value and the second value becomes a maximum value as the display area. Or, the wearable display device can determine a point where the sum of the first value and the second value is greater than a predetermined value as the display area. For instance, the wearable display device may find out a position of the reference display area making the sum of the first value and the second value to be maximized in a manner of repeating the steps S1002 to S1004 while moving the reference display area. And, in order to reduce the aforementioned repetition, the wearable display device may calculate the first value and the second value while moving the reference display area within a predetermined area only.

And, in determining the display area, the wearable display device may consider a maximum eye rotation. For instance, the wearable display device may determine an area within the maximum eye rotation as the display area among several determined display area candidates. And, the wearable display device may calculate the first value and the second value while moving the reference display area within a range of the maximum eye rotation only.

Although it is not depicted in FIG. 10, the methods of controlling the wearable display device mentioned earlier with reference to FIGS. 1 to 5 and FIG. 9 and the method of controlling the wearable display device mentioned earlier with reference to FIG. 10 can be combined with each other. The method of controlling the wearable display device can be performed by the wearable display device mentioned earlier with reference to FIGS. 1 to 3.

A wearable display device according to the present specification and a method of controlling therefor may be not limited to a configuration and a method of the aforementioned embodiments. Instead, various modifications can be achieved in a manner that all or a part of each of the embodiments is selectively combined with each other.

Meanwhile, a wearable display device according to the present specification and a method of controlling therefor can be implemented with a software readable by a processor in a recording media readable by the processor, which is equipped in the wearable display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A wearable display device, comprising:
   a display unit configured to display at least one image;
   a gaze sensor unit configured to track a gaze of a wearer of the wearable display device; and
   a processor configured to control the display unit and the gaze sensor unit, wherein the processor is further configured to:
   set a first visual field area corresponding to a front visual field of the wearer using the gaze sensor unit,
   calculate a first value by keeping a score of the first visual field area from which a reference display area on the display unit is excluded,
   set a second visual field area around a center of the reference display area, calculate a second value by keeping a score of the second visual field area where the reference display area is excluded from an overlapped area between the first visual field area and the second visual field area, allocate predetermined weighted values to the first visual field area, calculate the first value by summing up the predetermined weighted values allocated to the first visual field area other than the reference display area, allocate the predetermined weighted values to the second visual field area, and calculate the second value by summing up the predetermined weighted values allocated to the second visual field area where the reference display area is excluded from the overlapped area between the first visual field area and the second visual field area, determine a display area on the display unit based on the first value and the second value.

2. The wearable display device of claim 1, wherein the processor is further configured to determine the display area making a sum of the first value and the second value to be maximized by moving the reference display area.

3. The wearable display device of claim 2, wherein the processor is further configured to display the at least one image on the determined display area.

4. The wearable display device of claim 3, further comprising a context sensing unit containing at least one sensor selected from a sensor configured to sense an external image of the wearable display device, a sensor configured to sense a location of the wearable display device, a temperature sensor, an acceleration sensor and a gyro sensor, wherein the processor is further configured to receive context information from the context sensing unit and display the at least one image on at least one side among a predetermined dominant eye side and a predetermined non-dominant eye side of the wearer based on the context information.

5. The wearable display device of claim 4, further comprising a communication unit configured to communicate with an external device, wherein the processor is further configured to receive context information from the external device.

6. The wearable display device of claim 5, wherein the context information comprises at least one selected from a moving speed, a movement, acceleration and circumstantial information of the wearable display device.

7. The wearable display device of claim 3, wherein the processor is further configured to display the at least one image based on an application executed on the wearable display device and display the at least one image on at least one side among a predetermined dominant eye side and a predetermined non-dominant eye side of the wearer based on a predetermined criteria.

8. The wearable display device of claim 7, wherein the processor is further configured to:

categorize the application into an immersive application and a non-immersive application based on an operation of the application, if the immersive application is executed, display the at least one image on the predetermined dominant eye side or both the predetermined dominant eye side and the predetermined non-dominant eye side, and if the non-immersive application is executed, display the at least one image on the predetermined dominant eye side.

9. The wearable display device of claim 3, wherein the processor is further configured to display the at least one image on a predetermined dominant eye side of the wearer.

10. The wearable display device of claim 3, wherein the at least one image comprises a main image and a sub image and wherein the processor is further configured to display the main image on a predetermined dominant eye side of the wearer and display the sub image on a predetermined non-dominant eye side of the wearer.

11. The wearable display device of claim 2, wherein the processor is further configured to move the reference display area based on a movement of a gaze of the wearer.

12. The wearable display device of claim 11, further comprising an audio output unit, wherein the processor is further configured to provide at least one of a visual guide and an auditory guide to obtain a front gaze of the wearer, display the reference display area on the display unit and provide at least one of a visual guide and an auditory guide to move the gaze of the wearer.

13. The wearable display device of claim 12, wherein if the display area on the display unit is determined, the processor is further configured to provide at least one selected from the group consisting of visual feedback, an auditory feedback and tactile feedback.

14. The wearable display device of claim 2, wherein the processor is further configured to determine the display area on the display unit based on a maximum eye rotation.

15. The wearable display device of claim 2, wherein the processor is further configured to move the reference display area within a predetermined area of the display unit.

16. The wearable display device of claim 2, further comprising a communication unit configured to communicate with an external device, wherein the processor is further configured to make the external device display an image corresponding to the reference display area on a display of the external device.

17. The wearable display device of claim 2, wherein the predetermined weighted values are configured based on a spatial range in which a visual recognition of a person is formed and a resolution in case that the person is gazing at a point.

18. The wearable display device of claim 2, wherein the processor is further configured to adjust a size of the reference display area based on a distance between the display unit and the wearable display device.

19. A method of controlling a wearable display device, comprising the steps of:

setting a first visual field area corresponding to a front visual field of a wearer of the wearable display device using a gaze sensor unit of the wearable display device;

calculating a first value by keeping a score of the first visual field area from which a reference display area on a display unit of the wearable display device is excluded;

setting a second visual field area around a center of the reference display area;

calculating a second value by keeping a score of the second visual field area where the reference display area is excluded from an overlapped area between the first visual field area and the second visual field area; and allocating predetermined weighted values to the first visual field area, calculating the first value by summing up the predetermined weighted values allocated to the first visual field area other than the reference display area, allocating the predetermined weighted values to the second visual field area, and calculating the second value by summing up the predetermined weighted values allocated to the second visual field area where the reference display area is excluded from the overlapped area between the first visual field area and the second visual field area, determining a display area on the display unit based on the first value and the second value.

\* \* \* \* \*